United States Patent
Deng et al.

(10) Patent No.: US 8,351,120 B2
(45) Date of Patent: Jan. 8, 2013

(54) OPTICAL DEVICE HAVING EXTENTED DEPTH OF FIELD AND FABRICATION METHOD THEREOF

(75) Inventors: Jau-Jan Deng, Taipei (TW); Yu-Shu Kao, Taipei (TW); Yun-Chiang Hsu, Taoyuan County (TW)

(73) Assignees: VisEra Technologies Company Limited, Hsinchu (TW); OmniVision Technologies, Inc., Santa Clara, CA (US)

( * ) Notice: Subject to any disclaimer, the term of this patent is extended or adjusted under 35 U.S.C. 154(b) by 146 days.

(21) Appl. No.: 12/882,623

(22) Filed: Sep. 15, 2010

(65) Prior Publication Data

US 2012/0062997 A1    Mar. 15, 2012

(51) Int. Cl.
*G02B 27/10*    (2006.01)

(52) U.S. Cl. ....... 359/626; 359/619; 356/4.04; 348/241; 355/55

(58) Field of Classification Search ................. 359/368, 359/619, 620, 626; 348/241, E5.078; 438/60, 438/69–71; 257/432, 435, 436; 356/4.04; 264/2.5; 703/1, 2
See application file for complete search history.

(56) References Cited

U.S. PATENT DOCUMENTS

| | | | | |
|---|---|---|---|---|
| 5,076,687 | A * | 12/1991 | Adelson | 356/4.04 |
| 5,748,371 | A | 5/1998 | Cathey, Jr. et al. | |
| 6,714,282 | B2 * | 3/2004 | Inoue | 355/55 |
| 6,724,464 | B2 * | 4/2004 | Yang et al. | 355/55 |
| 7,723,662 | B2 * | 5/2010 | Levoy et al. | 250/208.1 |
| 7,780,291 | B2 * | 8/2010 | Saito et al. | 351/205 |
| 7,872,796 | B2 * | 1/2011 | Georgiev | 359/368 |
| 7,936,392 | B2 * | 5/2011 | Ng et al. | 348/349 |
| 2009/0128669 | A1 * | 5/2009 | Ng et al. | 348/241 |

* cited by examiner

*Primary Examiner* — Loha Ben
(74) *Attorney, Agent, or Firm* — Muncy, Geissler, Olds & Lowe, PLLC

(57) ABSTRACT

A method for designing an optical device which includes a lens and a microlens array is disclosed. A point spread function (PSF) of the lens including rotationally symmetrical aberration coefficients is formulated, wherein the PSF presents various spherical spot sizes. A virtual phase mask having phase coefficients is provided and the phase coefficients are added to the PSF of the lens, such that the various spherical spot sizes are homogenized. The virtual phase mask is transformed into a polynomial function comprising high and low order aberration coefficients. A surface contour of the lens is determined according to the rotationally symmetrical aberration coefficients and the low order aberration coefficients, and a sag height of each microlens in the microlens array is determined according to the high order aberration coefficients. An optical device using the design method is also disclosed.

16 Claims, 1 Drawing Sheet

OPTICAL DEVICE HAVING EXTENTED DEPTH OF FIELD AND FABRICATION METHOD THEREOF

BACKGROUND OF THE INVENTION

1. Field of the Invention

The invention relates to an optical device for reducing image errors and more particularly to an optical device with increased depth of field and method for fabricating the same.

2. Description of the Related Art

Improving optical imaging systems to obtain images that are free of errors or distortions introduced by optical devices used in optical imaging systems has long been a goal in the development of optical imaging technology. The errors or distortions introduced by the optical devices may include lens aberrations, such as non-rotationally symmetrical aberrations (e. g. coma or astigmatism aberrations) and rotationally symmetrical aberrations (e.g. spherical aberrations), and misfocus errors resulting from an object being located away from the position of best focus.

One approach to reduce such imaging errors or distortions introduced by the optical devices is to increase the lens F-number (which is the ratio of focal length to effective aperture diameter). However, increasing the lens F-number may reduce the optical efficiency of the optical imaging system. Another approach to reduce such imaging errors or distortions introduced by the optical devices is to increase the depth of field of the optical imaging system. Generally, a complicated lens system is capable of greatly expanding the depth of field, but is very expensive. Accordingly, it is desirable in the art to provide a simple optical imaging system with only one or a few lenses, which still has an extended depth of field.

U.S. Pat. No. 5,748,371 discloses an extended depth of field optical system using a specific phase mask that is located at one of the principal planes of the imaging system. Such a phase mask has been designed so that the optical transfer function (OTF) to remain approximately constant within some range from the in-focus position. However, since the phase mask needs to be implemented with a non-rotational surface with high accuracy, fabrication thereof is very difficult. Namely, fabrication errors increase for phase masks having complicated contours resulting in increased failures for subsequent image restoration processes, thus, increasing fabrication costs for camera module.

Therefore, there is a need to develop a novel optical device with increased depth of field capable of mitigating the above problems.

BRIEF SUMMARY OF THE INVENTION

A detailed description is given in the following embodiments with reference to the accompanying drawings. An embodiment of a method for designing an optical device comprising a lens and a microlens array comprises formulating a point spread function (PSF) of the lens comprising rotationally symmetrical aberration coefficients, wherein the PSF presents various spherical spot sizes. A virtual phase mask having phase coefficients is provided and the phase coefficients are added to the PSF of the lens, such that the various spherical spot sizes are homogenized. The virtual phase mask is transformed into a polynomial function comprising high and low order aberration coefficients. A surface contour of the lens is determined according to the rotationally symmetrical aberration coefficients and the low order aberration coefficients, and a sag height of each microlens in the microlens array is determined according to the high order aberration coefficients.

An embodiment of an optical device comprises an image sensor device including a microlens array thereon. A lens module includes a lens disposed above the image sensor device. The lens has a surface contour determined according to rotationally symmetrical aberration coefficients and low order aberration coefficients. Each microlens in the microlens array has a sag height determined according to high order aberration coefficients.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1:
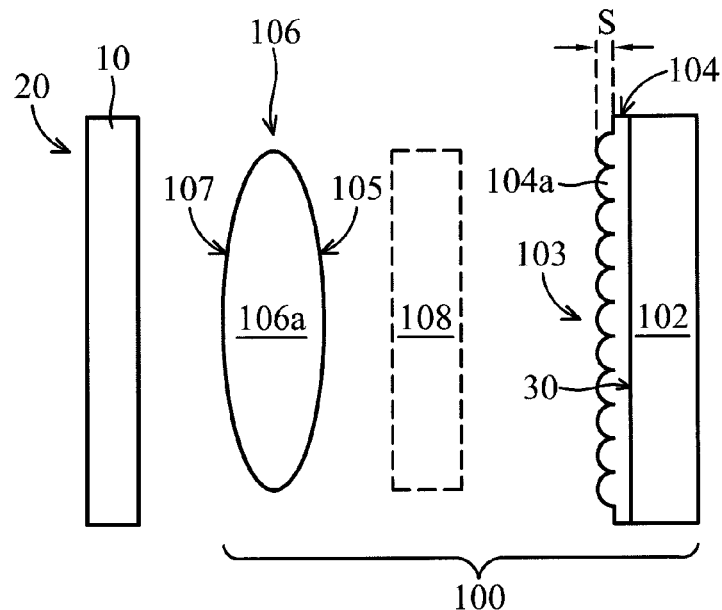
FIG. 1 is a cross section of an exemplary embodiment of an optical device according to the invention.

FIG. 1 illustrates an exemplary embodiment of an optical device 100 according to the invention. In the embodiment, the optical device 100, such as a digital camera, may comprise an image sensor device 102 and a lens module 106 constituted by at least one lens 106a and disposed above the image sensor device 102. The image sensor device 102 has a microlens array 104 thereon and corresponding to a pixel array (not shown) therein. Namely, each microlens in the microlens array 104 corresponds to each image sensor in the pixel array. The image sensor device 102 may be a charge coupled devices (CCD) or complementary metal oxide semiconductor (CMOS) type image sensor. The lens 106a in the lens module 106 may focus an image formed by an object 10 onto the image sensor device 102 through the microlens array 104. Namely, a surface 20 of the object 10 that faces the lens module 106 acts as an object plane of the optical device 100, and a surface 30 of the image sensor device 102 that faces the lens module 106 acts as an image focal plane.

In the embodiment, in order to correct a motion blurred image formed by the lens module 106 in subsequent image restoration processes, the optical device 100 is designed to minimize the variation of the point spread function (PSF) of the lens module 106a in different focal planes and fields, to extend the depth of field of the optical device 100. Here, the PSF is the impulse response of the optical device 100 in the spatial domain. Namely, the image from the optical device 100 is formed of a bright spot against a dark background. Such a design is described in detail hereinbelow.

Figure 2:
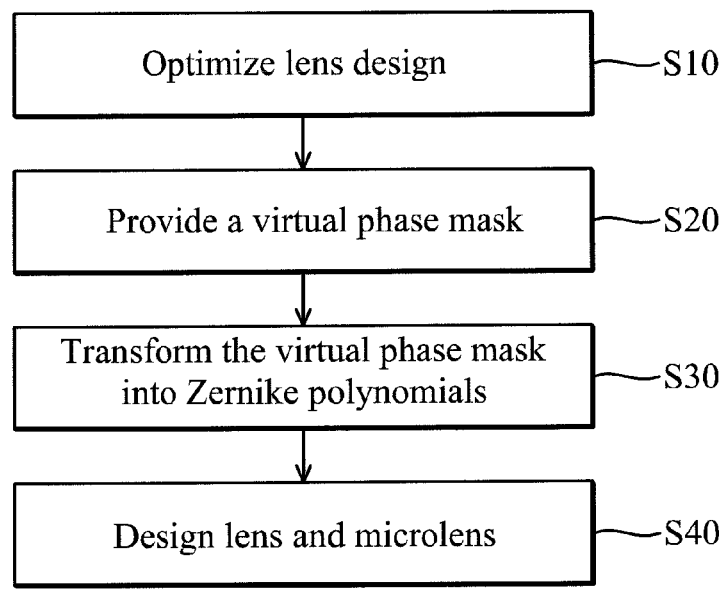
FIG. 2 is a flow chart of an exemplary embodiment of a method for designing an optical device according to the invention.

FIG. 2 is a flow chart illustrating an exemplary embodiment of a method for designing an optical device according to the invention. Note that the method is described hereinbelow with reference to the optical device 100 in FIG. 1, although the method of the invention may be applied to other optical devices or systems. In step S10, a point spread function (PSF) of a lens or lens set designed for an optical device is firstly formulated to obtain an optimized lens design. In the embodiment, the optimized lens design represents that the formulated PSF of the lens or lens set comprises rotationally symmetrical aberration coefficients and residual non-rotationally symmetrical aberration coefficients, such that the formulated PSF of the lens or lens set presents various spherical spot sizes in different fields and focal points. Typically, the rotationally symmetrical aberration coefficients are produced by spherical aberrations, and the non-rotationally symmetrical aberration coefficients are produced by coma or astigmatism aberrations. Accordingly, if the non-rotationally symmetrical aberration coefficients are not minimized to form the residual non-rotationally symmetrical aberration coefficients, the PSF cannot present spherical spots. In one embodiment, the non-rotationally symmetrical aberration coefficients in the formulated PSF are minimized, such that the spherical spots represented by the formulated PSF are mostly caused by rotationally symmetrical aberration coefficients (i.e. spherical aberrations).

In step S20, a virtual phase mask having phase coefficients is generated for modification of the formulated PSF of the lens or lens set. In the embodiment, the virtual phase mask having phase coefficients is provided and the phase coefficients are added to the formulated PSF of the lens or lens set, such that the various spherical spot sizes presented by the formulated PSF are homogenized. In the embodiment, the virtual phase mask may act as a virtual phase conjugate lens which can easily minimize the spherical aberrations introduced by the lens or lens set.

In step S30, the virtual phase mask is transformed into a polynomial function which comprises high and low order aberration coefficients. For example, the virtual phase mask is transformed into Zernike polynomials. In the Zernike polynomials, optical aberrations may be quantified according to Zernike coefficients. In the embodiment, the Zernike coefficients transformed by the phase coefficients in the virtual phase mask is decomposed into high and low order aberration coefficients.

In step S40, a design of an optical device comprising the lens or lens set in a lens module, the microlens on the image sensor device, and the virtual phase conjugate lens are generated. For example, a surface contour of the lens in the lens module is determined according to the rotationally symmetrical aberration coefficients in the formulated PSF and the low order aberration coefficients. Moreover, the sag height of each microlens in the microlens array is determined according to the high order aberration coefficients. Alternatively, the sag height of each microlens in the microlens array is determined according to the residual non-rotationally symmetrical aberration coefficients in the formulated PSF and the high order aberration coefficients. In the embodiment, the surface of the lens with the specified contour may face an object plane. Alternatively, the surface of the lens with the specified contour may face an image focal plane.

Referring back to FIG. 1, the optical device 100 is fabricated according to the design method shown in FIG. 2, such that a virtual phase conjugate lens 108 is formed between the object plane 20 and the image focal plane 30. In one embodiment, a surface contour 105 of the lens 106a is configured as a rotationally symmetrical contour that is determined by the rotationally symmetrical aberration coefficients in the formulated PSF and the low order aberration coefficients. The surface configured as the rotationally symmetrical contour faces the image focal plane 30 of the optical device 100.

Moreover, each microlens 104a in the microlens array 104 has a sag height S that is determined according to the high order aberration coefficients or according to the residual non-rotationally symmetrical aberration coefficients in the formulated PSF and the high order aberration coefficients, such that a surface contour 103 of the microlens array 104 is configured as a non-rotationally symmetrical contour. Namely, the microlenses 104a located at symmetric positions with respect to a central axis of the microlens array 104 may have different sag heights. In particular, the lens 106 with the designed surface contour 105 can be formed by conventional lens fabrication technology. Moreover, the microlens array 104 with the designed surface contour 103 with the non-rotationally symmetrical contour can be formed by conventional lithography process. In another embodiment, a surface contour 107 of the lens 106 may be configured as a rotationally symmetrical contour instead of the surface contour 105, such that the surface configured as the rotationally symmetrical contour faces the object plane 20. The designed surface contour 105 or 107 of the lens 106 and the designed surface contour 103 of the microlens array 104 forms the virtual phase conjugate lens 108 between the object plane 20 and the image focal plane 30.

According to the foregoing embodiments, since a virtual phase conjugate lens is incorporated into an optical device so as to minimize the PSF variation in different fields and focal planes, the depth of field of the optical device can be extended, to reduce imaging errors or distortions introduced by the optical devices. Moreover, since no real phase mask is needed to extend the depth of field of the optical device, fabrication costs can be reduced and the fabrication processes can be simplified. Additionally, since the lens in the virtual phase conjugate lens is designed to have a rotationally symmetric surface contour, the fabrication of the lens module is simplified and fabrication errors resulting in increased failures for subsequent image restoration processes are reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for designing an optical device comprising a lens and a microlens array, comprising:
    formulating a point spread function of the lens comprising rotationally symmetrical aberration coefficients, wherein the point spread function presents various spherical spot sizes;
    providing a virtual phase mask having phase coefficients and adding the phase coefficients to the point spread function of the lens, such that the various spherical spot sizes are homogenized;
    transforming the virtual phase mask into a polynomial function comprising high and low order aberration coefficients;
    determining a surface contour of the lens according to the rotationally symmetrical aberration coefficients and the low order aberration coefficients; and
    determining a sag height of each microlens in the microlens array according to the high order aberration coefficients.

2. The method of claim 1, wherein the polynomial function is Zernike polynomials.

3. The method of claim 1, wherein the formulated point spread function further comprises residual non-rotationally symmetrical aberration coefficients.

4. The method of claim 3, wherein the sag height of each microlens in the microlens array is determined according to the high order aberration coefficients and the residual non-rotationally symmetrical aberration coefficients.

5. The method of claim 1, wherein the surface of the lens faces an image focal plane.

6. The method of claim 1, wherein the surface of the lens faces an object plane.

7. An optical device, comprising:
   an image sensor device including a microlens array thereon; and
   a lens module including a lens disposed above the image sensor device,
   wherein the lens has a surface contour determined according to rotationally symmetrical aberration coefficients and low order aberration coefficients, and
   wherein each microlens in the microlens array has a sag height determined according to high order aberration coefficients.

8. The optical device of claim 7, wherein the rotationally symmetrical aberration coefficients are obtained by formulating a point spread function of the lens comprising rotationally symmetrical aberration coefficients, wherein the point spread function presents various spherical spot sizes.

9. The optical device of claim 8, wherein the high and low order aberration coefficients are obtained by the steps of:
   providing a virtual phase mask having phase coefficients and adding the phase coefficients to the point spread function of the lens, such that the various spherical spot sizes are homogenized; and
   transforming the virtual phase mask into a polynomial function comprising the high and low order aberration coefficients.

10. The optical device of claim 9, wherein the polynomial function is Zernike polynomials.

11. The optical device of claim 8, wherein the formulated point spread function further comprises residual non-rotationally symmetrical aberration coefficients.

12. The optical device of claim 11, wherein the sag height of each microlens in the microlens array is determined according to the high order aberration coefficients and the residual non-rotationally symmetrical aberration coefficients.

13. The optical device of claim 7, wherein the surface contour of the lens is configured as a rotationally symmetrical contour.

14. The optical device of claim 13, wherein the surface configured as the rotationally symmetrical contour faces an image focal plane of the optical device.

15. The optical device of claim 13, wherein the surface configured as the rotationally symmetrical contour faces an object plane of the optical device.

16. The optical device of claim 7, wherein a surface contour of the microlens array is configured as a non-rotationally symmetrical contour.

* * * * *